Patented Aug. 3, 1943

2,325,591

UNITED STATES PATENT OFFICE 2,325,591

PROCESS FOR PREPARING CYCLOPROPANE

Walter G. Christiansen, Glen Ridge, N. J., and John M. Ort, Rockville Centre, N. Y., assignors to E. R. Squibb & Sons, New York, N. Y., a corporation of New York No Drawing. Application October 9, 1941, Serial No. 414,354

7 Claims. (Cl. 260—666)

This invention relates to the preparation of cyclopropane.

Cyclopropane has heretofore been prepared by the reaction of trimethylene dihalides with finely-divided metal reduction agents in various liquid reaction media (in which the metal is suspended and the dihalide is more or less dissolved), e. g., by the reaction of trimethylene dibromide with zinc dust in aqueous ethanol. While this procedure has been developed to a high state of efficiency, the use of liquid reaction media gives rise to certain complications, inter alia, the (economic) necessity of recovering the medium if essentially alcoholic, and the occurrence of side reactions due to or involving the medium.

It is the object of this invention to provide an improved process of preparing cyclopropane which does not require the use of a liquid reaction medium.

The process of this invention essentially comprises contacting the vapor of a trimethylene dihalide with a metal reduction agent. The invention is applicable generally to the production of cyclopropane by the reduction of trimethylene dihalides; thus, the preferred trimethylene dihalides are the dibromide, chlorobromide, and dichloride, and the utilizable metal reduction agents include zinc, sodium, and magnesium. The reaction is favored by operating at elevated temperatures, which may be as high as about 500° C.; but a temperature of about 200°–300° C. is optimal from the standpoint of obtaining a reasonably rapid reaction with a minimum of charring. The reaction is also favored by higher surface-volume ratio in the metal reduction agent; hence, the agent is preferably used in an extended-surface form, inter alia, wire, granule, powder, or dust form.

The following example is illustrative of the invention: A metal (e. g., bronze) pipe is charged with zinc dust and placed in an electric furnace maintained at about 200–300° C. Trimethylene dichloride vapor is then passed through the zinc dust until the surface of the zinc becomes caked and inactivated. An about 50–60% yield of cyclopropane (based on the reacted trimethylene dichloride) is obtained; and the unreacted trimethylene dichloride condensed from the emerging gases is returned to the reaction.

The caked or coated zinc powder is reactivated by washing with water, filtering, and drying, and used for recharging the pipe.

The use of trimethylene chlorobromide or trimethylene dibromide in lieu of trimethylene dichloride in the foregoing example gives even better results; inasmuch as they are more reactive than the dichloride and hence do not require as high a reaction temperature, and the use of lower temperatures minimizes undesirable side reactions and increases the yield.

Magnesium or other metal reduction agents may be used in lieu of the zinc in the foregoing example; the pipe and the electric furnace reactor may be replaced by flame-heated charged glass tubes or any other suitable reactors; and the length of the hot zone in the pipe, the speed of the vapor addition, and the quantity of metal reduction agent in the pipe may be varied within wide limits. Preferably, however, the quantity of metal reduction agent is greatly in excess of that required for reaction with the quantity of dihalide used.

The invention may be variously otherwise embodied, within the scope of the appended claims.

I claim:

1. The process of preparing cyclopropane which comprises passing the vapor of a trimethylene dihalide through a reactor charged with a metal reduction agent.

2. The process of preparing cyclopropane which comprises passing the vapor of a trimethylene dihalide through a heated reactor charged with a metal reduction agent.

3. The process of preparing cyclopropane which comprises passing the vapor of a trimethylene dihalide through a reactor charged with zinc.

4. The process of preparing cyclopropane which comprises passing the vapor of trimethylene dichloride through a reactor charged with a metal reduction agent.

5. The process of preparing cyclopropane which comprises passing the vapor of a trimethylene dihalide through a reactor charged with a metal reduction agent and heated to about 200–300° C.

6. The process of preparing cyclopropane which comprises passing the vapor of a trimethylene dihalide through a reactor charged with a metal reduction agent in an extended-surface form.

7. The process of preparing cyclopropane which comprises passing the vapor of a trimethylene dihalide through a reactor charged with a metal reduction agent in an extended-surface form and heated to about 200–300° C.

WALTER G. CHRISTIANSEN.
JOHN M. ORT.